B. Irving,
Leaching Process,
N°. 85,174. Patented Dec. 22, 1868.
Fig: 1
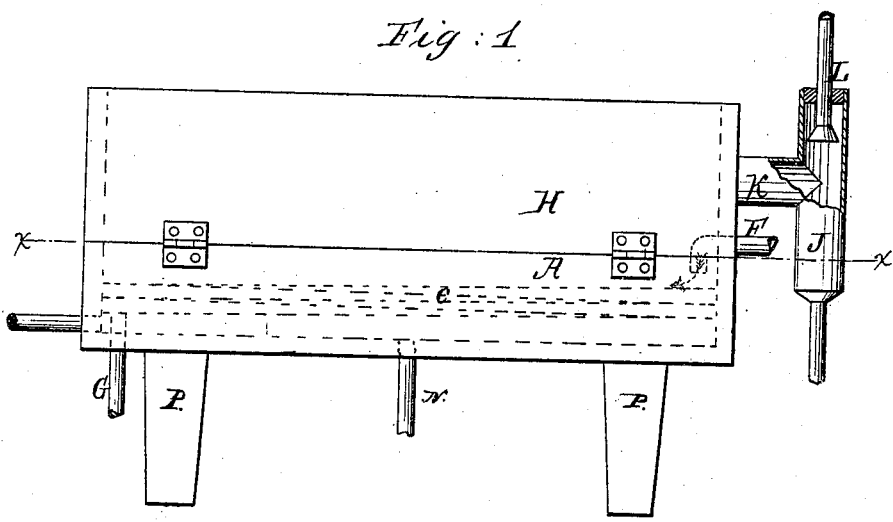
Fig: 2
Fig: 3
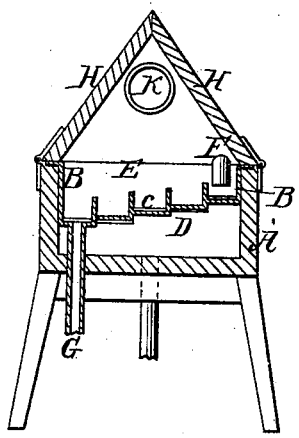
Witnesses:
Charles L. Barritt
Franklin Barritt
Inventor:
Benjamin Irving

UNITED STATES PATENT OFFICE.

BENJAMIN IRVING, OF NEW YORK, ASSIGNOR TO H. A. TAYLOR, OF SAME PLACE.

Letters Patent No. 85,174, dated December 22, 1868.

IMPROVED METHOD OF CONCENTRATING THE EXTRACT OF BARK FOR TANNING, &c.

The Schedule referred to in these Letters Patent and making part of the same.

*To all whom it may concern:*

Be it known that I, BENJAMIN IRVING, of the city, county, and State of New York, have invented a certain new and improved Method or Process of Concentrating the Liquid Extract of Bark for Tanning and other purposes; and I do hereby declare that the following is a full description of the same, reference being had to the accompanying drawings, forming a part of this specification, the same letters of reference, wherever they occur, referring to like parts, and which said drawings are descriptive of my invention of an improved apparatus for concentrating the liquid extract of bark for tanning-purposes, for which I have made an application for a patent, as a subdivision of the same.

Figure 1 is a side view of the apparatus.

Figure 2 is a plan view of the same, on the line $x\,x$, fig. 1, showing the channel-formed evaporating-pan.

Figure 3 is an end view of the same, through the line $x^2\,x^2$, fig. 2.

The object of my invention is to keep up a continuous operation of concentrating the liquid extract; second, to concentrate the liquid extract with great rapidity; third, to concentrate the liquid extract at a low degree of heat, and thus avoid burning the liquid, or decomposing it by precipitating the gallic acid from the tannic acid, and thus destroy or deteriorate the product.

To obtain these results, and at the same time at very little cost, I have constructed a surface-evaporating pan, C, by joining together, side by side, lengthways, fifteen (or more or less) flat-bottomed troughs, each having a descent of about one-quarter of an inch.

When the pan is thus formed it is secured, by means of flanges B, to the inside of a suitable box, A, so as to subdivide the same longitudinally into two compartments, D and E, the lower one being a steam-tight chamber, and the upper one an evaporating-chamber.

The operation is that when the liquid extract, as obtained from the leaching-vats, is let into or upon the evaporating-pan, by or through the pipe F, it follows the direction of the arrows, fig. 2, over the surface of the pan, till it reaches the outlet-pipe G.

By this course the liquid extract will have to travel about one hundred and fifty feet, and as the charge of liquid extract is so graduated through the feed-pipe F as to form only a thin sheet over the surface of the pan, it will be evident that but a low degree of heat need be used in the steam-chamber D to evaporate the excess of water from the extract, before it can escape by the outlet-pipe G.

In the ordinary boilers or condensing-apparatus used for concentrating the extract of bark for tanning-purposes, the liquid extract is heated in bulk. By this means it is found by experience that when the extract is heated in bulk for a long time, even at a low temperature, it causes a precipitation of the tannic acid from the solution, and leaving the gallic acid, which has no beneficial effect for tanning-purposes. It is therefore of the greatest possible consequence, to the successful concentration of the leached liquid extract of bark for tanning-purposes, that the liquor should be heated only for a minute's time, and then in such thin strata that it may cool down again to its original temperature as quickly as it had been heated to eliminate the excess of watery particles therefrom.

It will be obvious that, by my process of concentrating the liquid extract, it can be spread over a great amount of evaporating-surface, and in a film-like stratum. The consequence, therefore, is, that the excess of watery particles in the extract escapes therefrom rapidly, at a low degree of heat, and, as there is no bulk of heated concentrated extract, it readily cools down on discharging from the pan.

To facilitate the evaporating-operation, the chamber E has hinged side doors H, which operate or close so as to form a peaked roof. The object of this is, that by separating the doors at the peak more or less, a flue, or draught-hole, or opening is formed, so as to take off the vapor as it rises from the liquid extract on the pan.

When not rapid enough to take off all the vapor as fast as it rises, a condensing-apparatus, J, will be used, or other equivalent device, which, by means of a jet or sprinkler, L, of cold water, condensing the steam or vapor escaping through the exhaust-pipe K, will cause a partial vacuum in the evaporating-chamber, and thus quicken the operation of concentrating the extract.

It will be obvious, from this description of my improvement in concentrating the liquid extract of bark for tanning-purposes, that it entirely overcomes the objections heretofore made to the use of vacuum-pans for such purposes, or to the use of tubes or worms, in the manner of the distilling-process. Also, that it is very rapid in its operations, and at the same time makes a better liquid extract of tannin than is made by any other process known of, for the reason that it is not subjected to heat for as great a length of time as by the vacuum-pan process, and also to heat in bulk, which tends to a separation of the tannic from the gallic acids contained in the liquid extracts of bark.

In view of the importance of this new branch of industry, the making available the immense wealth of our forests, inaccessible to the tanner for manufacturing leather, on account of the cost of transportation of hides from the great centres of trade, and the necessity for having a pure soluble liquid extract of tannin, and at the same time of natural color, so as not to stain or darken the color of the leather, it will be obvious that an invention that accomplishes all these results is of the first magnitude in a commercial point of view.

By my invention and method or process of concentrating the liquid extract of bark, by means of a surface-evaporating pan operating continuously on a thin sheet of the liquor, these objects are successfully accomplished.

Having now described my new method or process of concentrating the liquid extract of bark for tanning and other purposes, I will proceed to set forth what I claim, and desire to secure by Letters Patent of the United States.

I claim the method or process of concentrating the liquid extract of bark for tanning and other purposes, by flowing it in a thin sheet continuously over the surface of an open evaporating-pan, made and operating in combination with the steam and condensing-chambers, or equivalents therefor, substantially as hereinbefore set forth.

BENJAMIN IRVING.

Witnesses:
   CHARLES L. BARRITT,
   FRANKLIN BARRITT.